Sept. 30, 1941.                A. G. COOLEY                     2,257,158
                          SYNCHRONOUS MOTOR CIRCUIT
                            Filed Aug. 11, 1939              2 Sheets-Sheet 2
Fig. 2.
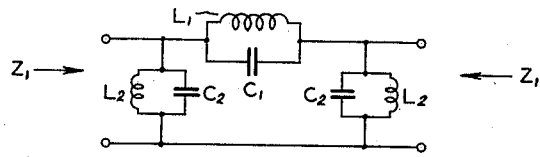
Fig. 8.
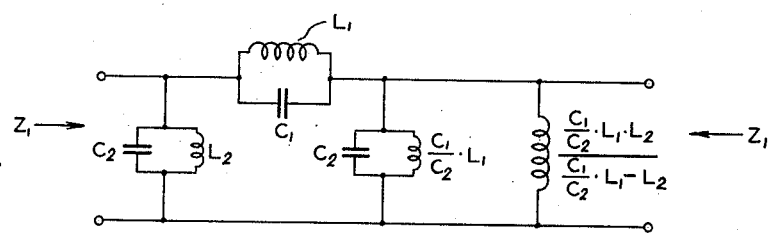
Fig. 9.
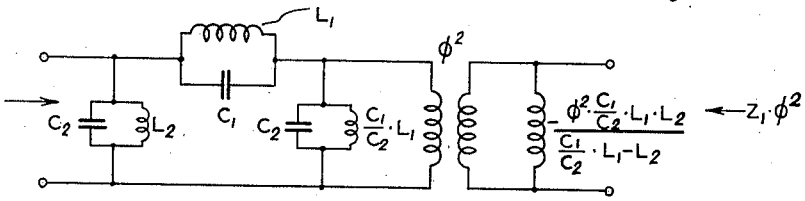
Fig. 10.
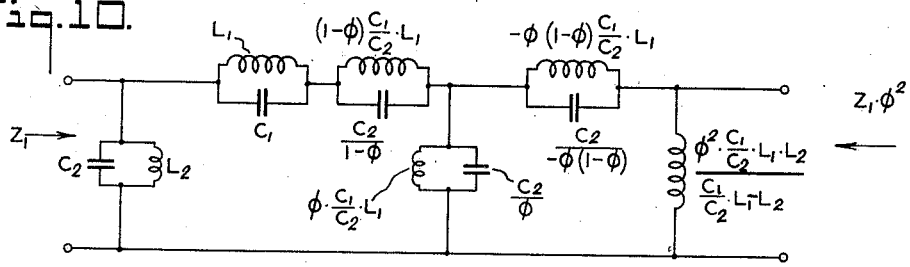
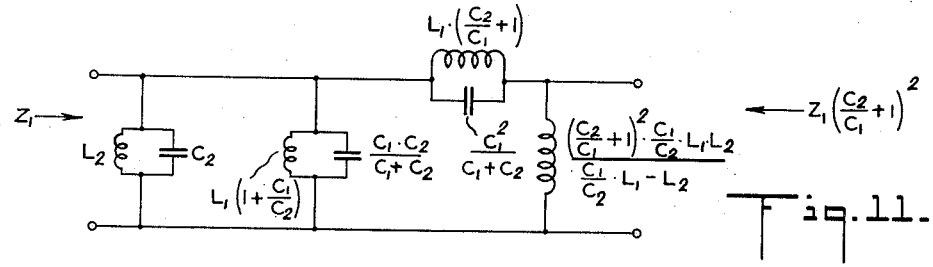
Fig. 11.
Fig. 12.
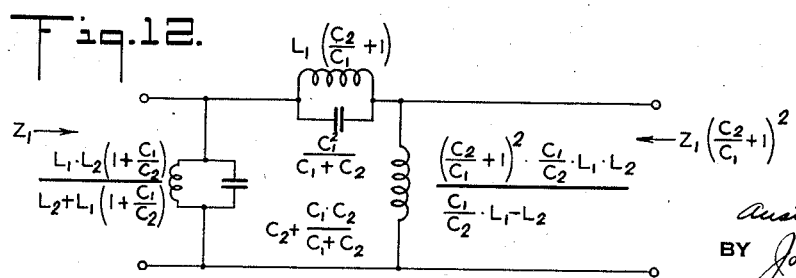
INVENTOR
Austin G. Cooley
BY John J. Rogan
ATTORNEY Patented Sept. 30, 1941

2,257,158

UNITED STATES PATENT OFFICE 2,257,158

SYNCHRONOUS MOTOR CIRCUIT

Austin G. Cooley, New York, N. Y., assignor, by mesne assignments, to Times Telephoto Equipment Inc., New York, N. Y., a corporation of New York Application August 11, 1939, Serial No. 289,516

16 Claims. (Cl. 172—274)

This invention relates to synchronous motor circuits and more particularly to circuits for driving a synchronous motor by the space current of an electric discharge tube.

A principal object of the invention is to provide a synchronous motor driving circuit which delivers the greatest power to the motor load when the motor is operated from a space discharge tube of the grid-controlled type.

Another principal object is to provide an efficient driving circuit for a synchronous motor of the self-excited type such for example a reluctance motor of the phonic wheel type, whereby the greatest power at the motor shaft may be derived from a given alternating current input.

Another object is to provide a simple electrical circuit for driving a synchronous motor with the greatest efficiency from a grid-controlled electric discharge tube.

Another object is to provide improved coupling circuits for coupling a self-excited synchronous motor such as a phonic wheel motor to a source of power of limited output, for example a tuning-fork controlled amplifier tube.

A further object is to provide a highly efficient synchronous motor circuit wherein the synchronous motor is driven by the space current of an electron discharge tube of the grid-controlled type and wherein the steady or D. C. component of the plate current of the tube also serves as the polarizing current of the motor.

A still further object is to provide a coupling circuit between a synchronous motor and an alternating current supply, whereby the effects of mechanical and electrical irregularities which tend to produce hunting, are considerably reduced.

In certain types of signalling systems, amongst which may be mentioned telegraph, tele-facsimile and the like, it is desirable to employ a synchronous motor for driving one or more parts of the equipment. Very frequently it becomes necessary to operate a synchronous motor without having recourse to the usual commercial supply mains or at a much higher frequency than that used on such mains. Thus in one known type of tele-facsimile system the signals are transmitted as an audio frequency modulated wave of approximately 1800 cycles per second, and the motor for driving the transmitter must therefore be operated synchronously at 1800 cycles per second. Usually the motor is controlled by a constant frequency device such as a tuning fork which is limited as to power output and therefore requires one or more amplifier tubes. Where the transmitting equipment is required to be of a conveniently manually portable nature it is particularly desirable to use small power amplifiers, although this is desirable in any transmitting apparatus whether portable or not. This necessitates highly efficient motors and coupling systems between the motor and electron tubes which feed power to the motor. Accordingly it is another principal object to provide a signalling mechanism, such as a tele-facsimile machine with a synchronous motor drive which can be operated with maximum efficiency from the output of an electron tube.

A feature of the invention relates to the combination of a synchronous motor of the reluctance or phonic wheel type having a special form of coupling circuit for operating it from the output of an electronic tube, the D. C. component of the tube output serving to polarize the motor windings, thus avoiding the use of separate excitation sources for the motor armature.

Another feature relates to the combination of an electron tube having its output coupled through a highly efficient coupling filter network which is especially designed to provide the desired impedance transformation between the tube and the motor and wherein the positive reactance of the motor constitutes one of the network elements.

A feature of the invention also relates to the combination of an electron tube whose plate current is used to drive a reluctance type synchronous motor wherein a special form of impedance transformation coupling is provided between the tube and motor for utilizing the tube output to the maximum efficiency.

A still further feature relates to the novel organization, arrangement and relative interconnection of parts which constitute a highly efficient but simple system for driving a reluctance type synchronous motor from an electron tube.

Other features and advantages not specifically enumerated will be apparent after a consideration of the following detailed description and the appended claims.

Referring to the drawings which show certain embodiments of the invention,

Fig. 2 is a preferred modification of the circuit of Fig. 1.

Fig. 3 is another embodiment of the invention.

Fig. 4 is a further modification of the circuit of Fig. 1.

Fig. 5 is a diagrammatic view of a typical reluctance type synchronous motor useful with the invention.

Fig. 6 is a curve diagram explanatory of certain features of the invention.

Figs. 7 to 12 are explanatory circuit diagrams showing the manner of computing the characteristics of the various coupling circuits illustrated in Figs. 1 to 4.

Figure 1:
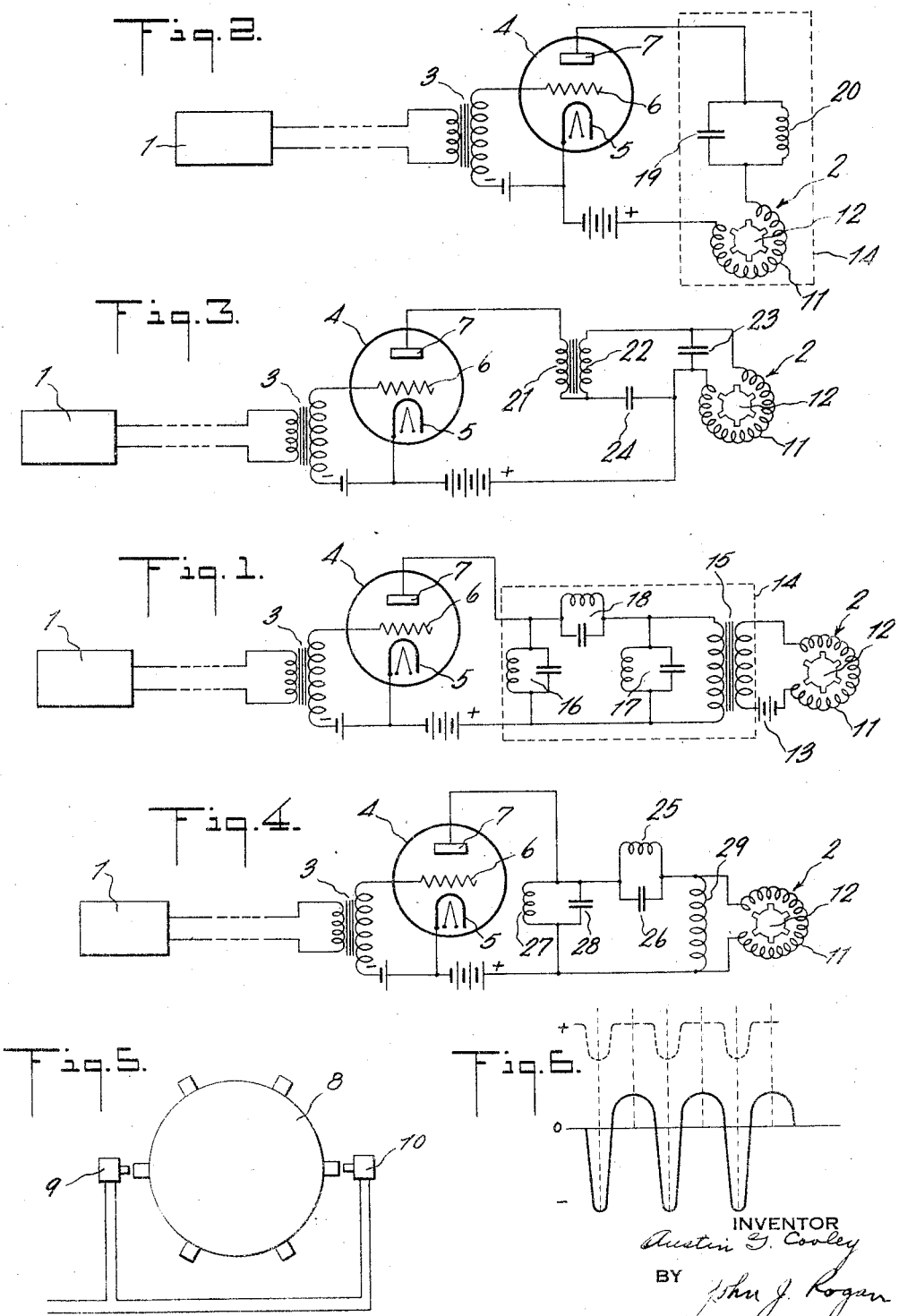
Figure 1 is a schematic diagram of one form of synchronous motor circuit embodying certain features of the invention.

In one embodiment that has proved to be commercially satisfactory, a synchronous motor of the reluctance or phonic wheel type is used to drive the entire mechanical system of a portable photo-transmitter, the motor being driven by an electron tube passing a plate current of approximately 50 milliamperes supplied by a tuning fork generator at a frequency of 1800 cycles per second. By using a special coupling arrangement according to the invention, it was possible to deliver a brake horse-power of approximately .004 H. P. to the synchronous motor load.

In order to operate efficiently a reluctance type synchronous motor such as disclosed for example in my prior Patent No. 2,015,742, it is necessary to supply a strong D. C. polarizing field. This can be done either by means of a permanent magnet or by an energizing coil associated with the rotor as described in said patent. In order to simplify the apparatus, it is desirable to energize the field of the synchronous motor by the D. C. component of the space current of the driver tube, which for example may pass through the stator coils of the conventional reluctance type phonic wheel motor. Because of the relatively low current in the plate circuit of the driver tube, it is necessary to have a large number of turns on the stator coils in order to produce a sufficiently strong polarizing field. I have found that in order to deliver the most mechanical horse-power to the motor load, it is necessary to give careful consideration to the coupling between the driver tube and the motor. Therefore a coupling network must be used which not only compensates for the reactive component of the motor when operating, but at the same time provides a proper impedance transformation. When operating, the motor may be considered as a resistance and a positive reactance, while the impedance of the driver tube can be considered a pure resistance. Preferably, and in accordance with the invention, the coupling network is designed so that the requisite impedance transformations are effected at the operating frequency of the motor and preferably by using the positive reactance of the motor as one of the elements of the coupling network.

Referring to Fig. 1, there is shown in block diagrammatic form a generator 1, which generates an alternating or pulsating current having a regular frequency component, the power from which is insufficient without amplification, to drive the synchronous motor 2. For example, the device 1 may take the form of a tuning fork which is maintained in vibration at its natural frequency by any means well-known in the art. Merely for explanation, it will be assumed that the generator 1 delivers an alternating voltage of 1800 cycles per second. This voltage is impressed by means of the low frequency transformer 3 on a grid-controlled electric discharge amplifier tube 4 which is preferably of the high vacuum type, although a grid-controlled tube of the gas or vapor type may be employed. While the tube 4 is shown as of the triode type comprising the electron-emitting cathode 5, control-grid 6 and anode or plate 7, it will be understood that any other well-known form of electron amplifier tube may be employed. Preferably the grid 6 is biased negatively with respect to the cathode 5 so that its plate impedance remains low and constant over the greater portion of each cycle of impressed signal voltage. For example the tube 4 may be of the type 6A5, the control-grid being biased approximately 30 volts negatively and the plate voltage 8 at approximately 280 volts positive.

As shown in detail in Fig. 5, the motor comprises a toothed rotor 8 of suitable magnetic material and a pair of wound polarizing stators 9, 10. In Fig. 1, the stator is represented by a single winding 11 and the toothed rotor is indicated by numeral 12. The stator is polarized by a D. C. supply 13 which may be a battery or it may be a suitable tap on the power supply for tube 4. Because of the relatively low plate current which is obtainable from tube 4, it is necessary to wind the stator 11 with a large number of turns and the impedance thereof may greatly exceed the plate impedance of tube 4. For purposes of explanation tube 4 may be considered as a low impedance generator supplying power to motor 2. The stator 11 is coupled to the plate circuit of tube 4 by a special form of coupling network indicated by the dotted rectangle 14. This network is designed to compensate for the reactance component of motor 2 when operating, and to provide the requisite impedance transformation between the tube and motor.

Since in most practical cases it has been found that the tube impedance is low compared to the impedance represented by the motor and its load, a step-up impedance transformation is required. This is accomplished by employing a theoretically ideal transformer 15 as part of the coupling network. In the embodiment of Fig. 1, the network also includes the two shunt arms 16, 17, and the series arm 18 each arm comprising a combination of inductance and capacitance as shown. The shunt arms 16, 17, are designed to be anti-resonant at approximately 2000 cycles, and the series arm 18 is designed to be anti-resonant at approximately 400 cycles. By suitably proportioning the values of the various components as described hereinbelow, the necessary impedance transformations may be made between the tube and motor so that the greatest amount of mechanical power is developed over the operating range of the motor, as compared with a direct connection of the tube and motor.

The invention is distinguished from the provision of a mere tuned circuit interposed between an alternating current source and a synchronous motor. One of the main distinguishing features is that with a synchronous motor of the reluctance type, it is necessary to provide the most efficient D. C. polarizing current. Consequently, in accordance with the invention, a specially designed filter circuit is used as a coupling link the filter circuit providing not only the optimum impedance transformation but also allowing the greatest amount of D. C. polarizing current to flow through the filter. Furthermore where, as in the case of facsimile systems and the like the motor may at different times be required to run at different synchronous speeds, it becomes important to preserve this proper impedance transformation and D. C. polarizing current flow. The arrangement according to Fig. 1, will enable the motor to be synchronized with equal efficiency for any frequency within the limits of the pass-band of the coupling circuit. However where the synchronizing frequency is invariable the coupling circuit may be suitably designed so that certain sections thereof become equivalent to extremely high resistances, so that for practical purposes they can be omitted without affecting the desired impedance transformation.

While the arrangement of Fig. 1 provides the requisite theoretical impedance transformation between the driver tube and the motor, it is open to a number of objections one of which is that it requires a separate battery 13 for exciting the motor. I have found that the coupling network of Fig. 1 can be converted to a simpler network which enables the D. C. component of the tube plate current to be used for the motor excitation while at the same time effecting the requisite impedance transformations. Furthermore, if the motor is to be driven at a single frequency e. g. 1800 cycles per second, this network may be even further simplified as shown in Fig. 2. In Fig. 2 the parts corresponding to those of Fig. 1 are designated by the same numerals. The elements 11, 19 and 20, are so designated as to accomplish the same functions as elements 15 to 18 of Fig. 1. This is accomplished in general by compensating the positive reactance of the motor stator 11 by the impedance transformation network.

In designing the various elements of the coupling network the first consideration should be given to the polarizing field required for the motor. The resistance of winding 11 should be approximately the same as the plate resistance of tube 4, however since the D. C. component of the plate current must pass through the coupling network and the motor, it is necessary to employ the condenser 19 and inductance 20 to compensate for the positive reactance of the motor when operating. Accordingly, the inductance 20 should preferably be anti-resonant at some frequency well below that of source 1, consequently for all frequencies above the anti-resonant frequency the combination 19, 20, will compensate for the positive reactance of the motor windings. A simple method of accomplishing the desired result would be to make inductance 20 very large, taking care to design it so that its distributed capacity does not resonate the coil below the driving frequency, and then to adjust the condenser 19 until the greatest alternating current flow occurs in the motor windings. In practice I have found that the inductance 20 can have a value of from 1 to 10 henries as measured on an A. C. bridge and the condenser 19 can have a capacitance of from 0.02 to 0.01 mfds. In one circuit that was found to produce the most efficient results, the tube 4 was of a low impedance type, e. g. a type 6A5 tube operating with a negative grid bias voltage of approximately 30 volts; a plate voltage of approximately 280 volts; the condenser 19 being between 0.01 and 0.015 mfds. and inductance 20 being approximately 5 henries. In any case the windings 11 should be designed to give the greatest number of ampere-turns within the resistance limitations imposed by tube 4 and the ohmic resistance of inductance 20. After the motor windings have been constructed, the operating impedance of the motor should be measured in any well-known manner so as to make the necessary calculations for the values of elements 19 and 20, the impedance of tube 4 being usually supplied by the tube manufacturer. There will be given hereinbelow, detailed instructions for the design of the coupling network elements, but for the present, suffice it to say that the anti-resonant frequency of the impedance arms must not approach too closely the mid-band frequency of the coupling circuit. In order that the D. C. resistance of element 20 may be kept low, the anti-resonant frequency is preferably chosen to be less than that of the mid-band frequency. In practice, it has been found desirable in some cases to make the anti-resonant frequency of the combination 19, 20, about one-fourth the mid-band frequency. Thus in the case of 1800 cycle operation the combination 19, 20, should have an anti-resonance at about 400 cycles per second.

When the combination 19, 20, is properly designed, under normal operating conditions the A. C. voltage thereacross will be approximately equal to that across the motor windings but opposite in phase. I have found that voltages of the order of 700 volts can be thus supplied to the motor even though the actual voltage at the plate of tube 4 is only 250. The plate current through the motor coils reaches as high as 300 milliamperes although the average plate current of tube 4 is only 70 milliamperes. Since the impedance of the motor varies with the load and sometimes fluctuates because of hunting, the stability is generally improved by making the condenser 19 of slightly higher capacity than the theoretical optimum value, as pointed out hereinbelow. Efficient operation is realized when tube 4 is operated so that its plate impedance remains low over the greater part of each cycle of input voltage, but it is not necessary to drive the tube as in a conventional "Class B" amplifier. Furthermore the coupling network of Fig. 2 is to be distinguished from the mere provision of a condenser across the motor windings tuned to the synchronous frequency. For example with the coupling circuit of Fig. 2, it is possible to get as high as 3.5 lbs. friction load on the motor without throwing it out of synchronism whereas with a simple tuned circuit resonating at the synchronous frequency the motor could not withstand friction loads of more than 1.5 lbs. without losing synchronism.

In order to illustrate diagrammatically the effect of the coupling network of Fig. 2, there is shown in Fig. 6 in the dotted-line curve the grid-voltage curve of tube 4 in the absence of the coupling network, this curve also representing the wave form of the voltage across the motor. With the coupling network in circuit, the voltage across the motor will be approximately as shown in the full-line curve of Fig. 6 showing that it is of much greater amplitude swing between peaks and is substantially sinusoidal. Under the best adjustment of the coupling network the positive portion of each cycle will be somewhat reduced and flattened as compared with the negative portion, as shown in somewhat exaggerated form in Fig. 6. It is to be noted that the insertion of the special coupling network not only gives a motor driving impulse over the normally flat section of the input wave, but also increases the amplitude of the lower section. That is, the peak-to-peak voltage is more than doubled by the insertion of the network. One possible explanation is that when the grid 6 goes zero and the plate-cathode impedance becomes very low, the coupling circuit discharges into the motor and supplies power.

As will be explained hereinbelow the particular coupling network of Fig. 2 may be replaced by a number of equivalent networks. Thus in the embodiment of Fig. 3, the network includes a low frequency transformer having coupled windings 21, 22, which are designed to effect the requisite impedance transformation between the tube 4 and the motor load. In order to compensate for the positive reactance of the motor when in operation, a condenser 23 is provided. The other condenser 24 is of negligible reactance at the frequencies under consideration and is used merely as a stopping or D. C. insulating condenser so that substantially all the D. C. component of the tube plate current flows through the motor windings.

Fig. 4 shows a further modification of the coupling network comprising a series arm 25, 26, and the shunt arm 27, 28, and shunt arm 29 for effecting the requisite impedance step-up transformation and the requisite resistance matching between the tube and motor.

A theoretical discussion will now be given for the calculation of the basic coupling filter network such as that of Fig. 1 and for purposes of calculation the essential portion of the network is reproduced in Fig. 7 with conventional impedance symbols. Assuming that the motor 2 is to be operated at any frequency between upper and lower cut-off frequencies $f_2$ and $f_1$, then the values of the inductances and capacitances in terms of these upper and lower cut-off frequencies and the frequency of maximum attenuation $f_\infty$, are as follows:

$$L_1 = \frac{4m_2}{1-m_2} \times \frac{(f_2-f_1)R_0}{4f_1 f_2} \tag{1}$$

where $R_0$ is the resistance of the filter section at mid-band frequency, and where $$m_2 = \sqrt{\frac{1-\left(\frac{f_\infty}{f_1}\right)^2}{1-\left(\frac{f_\infty}{f_2}\right)^2}} \tag{2}$$

$$C_1 = \frac{1-m_1^2}{4m_1} \times \frac{1}{\pi(f_2-f_1)R_0} \tag{3}$$

$$m_1 = \frac{f_1}{f_2} \cdot m_2 \tag{4}$$

$$L_2 = \frac{2}{m_2} \times \frac{(f_2-f_1)R_0}{4\pi f_1 f_2} \tag{5}$$

$$C_2 = \frac{m_1}{2} \times \frac{1}{\pi(f_2-f_1)R_0} \tag{6}$$

In most practical cases, where the impedance of the tube is low compared to the impedance represented by the motor and its load, a step-up impedance transformation is required. This is accomplished by the expedient of inserting a theoretically ideal transformer between the series arm and the last shunt arm, as shown in Fig. 9. However, in order to calculate the impedance transformation portion, it is necessary to consider the coil $L_2$ of the second shunt arm (Fig. 7) as divided into two parts as shown in Fig. 8, so that the shunt anti-resonant arm will resonate at exactly the same frequency as the series arm $L_1 C_1$.

The network of Fig. 9 which corresponds at the mid-band frequency to the coupling network of Fig. 1, can be converted into an equivalent network by replacing the shunt arm and ideal transformer of Fig. 9 by the equivalent "pi" section as shown in Fig. 10. The value "$\phi$" which determines the impedance step-up can be selected so as to make the two series arms exactly equal and opposite in phase at all frequencies, so that the total impedance becomes zero and the configuration of the network becomes that shown in Fig. 8.

The value of "$\phi$" is determined by solving the equation $$L_1 + (1-\phi)\frac{C_1}{C_2}L_1 = 0 \tag{7}$$

that is $$\phi = \frac{C_2}{C_1} + 1 \tag{8}$$

It will be seen that this value of "$\phi$" will also satisfy the equation $$\frac{C_1 + \frac{C_2}{1-\phi}}{\frac{C_1 C_2}{1-\phi}} = 0 \tag{9}$$

showing that the sum of the impedance of the two condensers $C_1$ and $$\frac{C_2}{1-\phi}$$

in Fig. 10 is zero, as well as the sum of the impedance of the two coils $L_1$ and $$(1-\phi)\frac{C_1}{C_2}L_1$$

After the two above-mentioned series arms have been eliminated and the value of $\phi$ as given by Equation 8 has been substituted in Fig. 10, we have the configuration and values shown in Fig. 11.

The next step is to combine the first two shunt arms, giving the form shown in Fig. 12 which corresponds to that of Fig. 4. This network now provides the maximum possible impedance step-up for any given values of capacitances $C_1$ and $C_2$, that is the Maximum impedance transformation =

$$\left(\frac{C_2}{C_1}+1\right)^2 \tag{10}$$

and the

Maximum voltage step-up =

$$\frac{C_2}{C_1}+1 \tag{11}$$

In practical design however, it is frequently more convenient to compute the element values directly in terms of the cut-off frequencies. From Equations 3 and 6, we see that $$\frac{C_2}{C_1}+1 = \frac{1+m_1^2}{1-m_1^2} \tag{12}$$

Substituting this value in Fig. 12, we have the element values for the corresponding elements of the network of Fig. 4 as follows, Coil 27 =

$$\frac{2R_0}{\frac{m_1^2}{m_2}\left(\frac{1-m_2^2}{1+m_1^2}\right)+m_2} \times \frac{f_2-f_1}{4\pi f_1 f_2} \tag{13}$$

Condenser 28 =

$$\frac{m_1}{1+m_1^2} \times \frac{1}{\pi(f_2-f_1)R_0} \tag{14}$$

Coil 25 =

$$\frac{1+m_1^2}{1-m_1^2} \times \frac{4m_2}{1-m_2^2} \times \frac{(f_2-f_1)R_0}{4\pi f_1 f_2} \tag{15}$$

Condenser 26 =

$$\frac{1-m_1^2}{1+m_1^2} \times \frac{1-m_1^2}{4m_1} \times \frac{1}{\pi(f_2-f_1)R_0} \tag{16}$$

Coil 29 =

$$\frac{\left(\frac{1+m_1^2}{1-m_1^2}\right)^2}{m_2 - \frac{m_1^2}{m_2}\left(\frac{1-m_2^2}{1-m_1^2}\right)} \times \frac{2R_0(f_2-f_1)}{4\pi f_1 f_2} \tag{17}$$

where $m_1$ and $m_2$ have the values given in Equations 2 and 4 respectively.

Referring now to Fig. 4, assume that the tube 4 is a type 6A5 tube having an internal impedance of approximately 800 ohms and the motor 2 has an inductance of 314 millihenries with the plate current flowing through its windings and is to run synchronously at any desired frequency between the cut-off frequencies of 1600 and 2000 c. p. s., for example 1800 cycles per second. The peak frequency of the series arm 25, 26, would then be chosen at 400 cycles giving the following values from Equations 2 and 4, $m_2=0.988$ $m_1=0.790$. Substituting these values in Equations 13 to 17, the values of the elements 25, 26, 27, 28 and 29 can be computed.

It will be noticed that the first shunt arm 27, 28, of Fig. 4, is anti-resonant at the mid-band frequency $\sqrt{f_1 f_2}$ and therefore represents a very high resistance at that frequency. In case it is desired to drive the motor at a single frequency the shunt arms can be omitted and replaced with a high resistance having the value $2\pi f L Q$. Where $f$ is the synchronous frequency, L the inductance of the coil 27, Q is the ratio of the reactance to the effective resistance of the coil at the synchronous frequency. This results in the configuration of Fig. 2 which is the preferred embodiment.

While in the foregoing description, particular values of the network elements have been given, slight changes may be made from the ideal values without destroying too much the efficiency of operation. Furthermore, while the amplifier tube has been described as being excited by means of a tuning fork oscillator, it will be understood that any other well-known form of constant frequency oscillator may be employed. While the invention is particularly useful in connection with a transmitting mechanism such as a photo-transmitter, it will be obvious that it can be applied also to a receiving mechanism such as the motor for driving a photo-receiver or the like; and while the specification refers to an amplifier tube, it will be understood that one or more stages of amplification may be employed.

What I claim is:

1. In combination, a synchronous motor, an electron tube for supplying power to said motor at a synchronous frequency, and a coupling network between the tube and motor, said network having a filter section with a step-up impedance transformation characteristic, for substantially matching the impedance of the motor when running to the internal impedance of said tube.

2. In combination, a synchronous motor, a source of power for said motor comprising means to produce an alternating current and a grid-controlled amplifier tube therefor, means to bias the grid of said tube so that the internal impedance during the greater part of each input signal cycle is low compared with the impedance of said motor when operating, and a coupling filter network between the tube and motor having a step-up impedance transformation characteristic for substantially matching the impedance of the motor when running with the impedance of said tube.

3. In combination, a synchronous motor of the phonic wheel type having a positive reactance characteristic when running, a source of power for said motor, means to couple said motor to said source of power including a grid-controlled amplifier tube and a coupling filter network in series with said motor whereby the reactance components of the motor are compensated for, said filter network being capable of passing the direct current from said tube to said motor.

4. The combination according to claim 3, in which the positive reactance of the motor when running constitutes one of the filter elements.

5. In combination, a synchronous motor of the reluctance type, a source of power for said motor including a grid-controlled amplifier tube having its grid excited from a source of control frequency, and a coupling network between said tube and motor, said network including an impedance transformation section and being conductively connected to the motor windings so that the D. C. component of the plate current serves to polarize the motor windings.

6. In combination, a synchronous motor of the phonic wheel type, a grid-controlled amplifier tube for supplying power to said motor, and a series circuit between the cathode and anode of said tube including the plate potential source of the tube, a motor winding and a coupling network including an inductive reactance for compensating the difference between the internal impedance of the tube and the impedance of the motor winding while allowing the D. C. component of the plate current to polarize said winding.

7. The combination according to claim 6, in which a capacitance is provided in shunt to said inductive reactance to compensate for the positive reactance of the motor when running.

8. In combination, a synchronous motor of the phonic wheel type, a grid-controlled amplifier tube for supplying power to said motor, and an impedance transformation network connecting the motor windings in series with the plate and cathode of said tube, whereby the D. C. component of the plate current flows through the motor windings, said network being anti-resonant at a frequency widely separated from the synchronous operating frequency of the motor.

9. The combination according to claim 8, in which the electric components of said network are proportioned so that the network is anti-resonant at approximately ¼ of the said synchronous frequency.

10. In combination, a synchronous motor of the phonic wheel type arranged to run in synchronism at any frequency between $f_1$ and $f_2$, a grid-controlled electron tube whose plate circuit supplies power to said motor, an impedance transforming filter network having cut-off frequencies $f_1$, $f_2$, and being anti-resonant at a frequency well outside the band $f_1$—$f_2$, said filter providing a D. C. conductive path between the motor windings and the plate circuit of said tube.

11. In combination, a synchronous motor of the reluctance type, a grid-controlled amplifier tube for supplying power to said motor, an impedance transforming filter network coupling the tube to the motor so that the D. C. component of the tube plate current polarizes the motor windings, said network having a reactance arm which is anti-resonant at a frequency well removed from the operating frequency range of the motor whereby the negative impedance of said arm is substantially equal to the positive impedance of the motor in running conditions.

12. The combination according to claim 11, in which the electric components of the network are proportioned so that the anti-resonance is approximately ¼ of the mid-band frequency of said filter network.

13. In combination, a synchronous motor of the reluctance type, a grid-controlled amplifier tube for supplying power to said motor, a coupling network between the tube and the motor including a transformer to compensate for the difference between the internal impedance of the tube and the impedance represented by the motor and its load, said network being connected so that the D. C. component of the plate current of said tube flows through both windings of the transformer and through the motor windings.

14. In combination, a synchronous motor of the reluctance type, a grid-controlled amplifier tube for supplying power to said motor, a transformer having its windings connected in series and in series with the motor windings and with the plate supply of said tube, whereby the D. C. component of the tube plate current flows through the motor windings.

15. In combination, a synchronous motor of the phonic wheel type, a grid-controlled amplifier tube for supplying power to said motor, and a coupling band-filter network between the tube and motor, said network including a series filter arm, a shunt filter arm and an impedance all coacting to provide a step-up impedance transformation between the tube and motor while allowing the D. C. component of the tube output current to polarize the motor windings.

16. The combination according to claim 15 in which the coupling network is anti-resonant at a frequency well removed from the mid-band frequency of the network.

AUSTIN G. COOLEY.